United States Patent [19]
Hokino et al.

[11] Patent Number: 5,861,118
[45] Date of Patent: Jan. 19, 1999

[54] METHOD AND SYSTEM FOR CONTROLLING INJECTION MOLDING APPARATUS

[75] Inventors: Syuichi Hokino; Hirofumi Ogihara, both of Nagano, Japan

[73] Assignee: Nissei Plastic Industrial Co., Ltd., Nagano-ken, Japan

[21] Appl. No.: 733,571

[22] Filed: Oct. 18, 1996

[30] Foreign Application Priority Data

Oct. 20, 1995 [JP] Japan ................................ 7-297431

[51] Int. Cl.⁶ ................................................ B29C 45/80
[52] U.S. Cl. ................. 264/40.1; 264/328.1; 425/150; 425/590; 364/475.05
[58] Field of Search ............................... 264/40.1, 40.5, 264/40.7, 328.1; 425/145, 150, 542, 589, 590, 593, 595; 364/475.05, 475.02

[56] References Cited

U.S. PATENT DOCUMENTS

| | | | |
|---|---|---|---|
| 3,767,339 | 10/1973 | Hunkar | 425/145 |
| 4,642,044 | 2/1987 | Ishikawa et al. | 425/593 |
| 4,726,920 | 2/1988 | Yokota | 425/150 |
| 4,735,564 | 4/1988 | Sasaki et al. | 425/145 |
| 4,828,475 | 5/1989 | Kamiguchi | 425/150 |
| 4,841,208 | 6/1989 | Itoh | 425/145 |
| 4,846,654 | 7/1989 | Neko | 425/150 |
| 5,110,283 | 5/1992 | Bluml et al. | 425/595 |
| 5,180,530 | 1/1993 | Cropper et al. | 264/40.5 |
| 5,219,584 | 6/1993 | Itsuzi et al. | 264/40.5 |
| 5,232,714 | 8/1993 | Kohno et al. | 425/145 |
| 5,238,383 | 8/1993 | Bannai | 425/150 |
| 5,342,559 | 8/1994 | Kamiguchi et al. | 425/145 |
| 5,371,450 | 12/1994 | Hiraoka | 425/145 |
| 5,380,181 | 1/1995 | Hiraoka et al. | 264/40.7 |

FOREIGN PATENT DOCUMENTS 5138705  6/1993  Japan .

*Primary Examiner*—Jill L. Heitbrink
*Attorney, Agent, or Firm*—Birch, Stewart, Kolasch & Birch, LLP

[57] ABSTRACT

An injection molding machine includes a feedback control system for controlling both the speed and position of a control object, such as a movable platen or an injection screw. The feedback control system includes a driving mechanism connected to the control object and a monitor monitoring the position of the control object. The monitor transmits signals representative of the sensed position of the control object. A speed control system controls the driving mechanism until the control object reaches a threshold position. Thereafter, a position control system controls the driving mechanism. A switch is provided to change the feedback control system from the speed control system to the position control system.

11 Claims, 4 Drawing Sheets

METHOD AND SYSTEM FOR CONTROLLING INJECTION MOLDING APPARATUS

BACKGROUND OF THE INVENTION

1. Field of the Invention

The present invention relates to a method and a system for controlling an injection molding apparatus. More particularly, the present invention relates to a method and a system for advancing a control object using a driving mechanism and for stopping the control object at a target position.

2. Description of the Related Art

A control system for an injection molding apparatus which controls an advancing control object (such as an injection screw of an injection device, or a movable platen of a clamping device) is known. The known control system includes a driving mechanism having a servo motor. The servo motor is stopped upon the control object reaching a preliminarily set target position. Such a known control system is disclosed in Japanese Unexamined Patent Publication (Kokai) No. Heisei 5-138705.

FIG. 4 shows such a control system 40 of this type. In FIG. 4, an injection molding apparatus 41 has an injection device 42 and a clamping device 43. The clamping device 43 includes a servo motor 44. Upon clamping, a movable platen 45 is advanced from a forward motion start position by means of the servo motor 44 which is controlled by a control system. At this time, a position of the movable platen 45 is indirectly detected, on the basis of a number of revolutions of the servo motor 44, by means of an encoder 46.

An obtained position detected value Dxd is supplied to a first error detecting portion 47. The first error detecting portion 47 also receives a position command value Dxc. Then, a first error of the position detected value Dxd and the position command value Dxc is generated by the first error detecting portion 47.

The first error is converted into a converted speed command value Dvs via a position control portion 48. The position control portion 48 can include a compensation circuit or similar circuitry. The converted speed command value Dvs is received by a second error detecting portion 49. The position detected value Dxd is converted into a speed detected value Dvd by a speed converting portion 50. The speed detected value Dvd is also received by the second error detecting portion 49. Then, a second error of the speed detected value Dvd and the converted speed command value Dvs is generated by the second error detecting portion 49.

The second error is converted into a current command value Dic via a speed control position 51. The speed control portion 51 can include a compensation circuit or similar circuitry. The current command value Dic is applied to the servo motor 44 via a feedback control circuit 52.

The feedback control circuit 52 includes a current loop. It should be noted that the reference numeral 53 denotes a current detecting portion, 54 denotes a third error detecting portion and 55 denotes a current control portion. The current control portion 55 can include a compensation circuit or similar circuitry.

However, since a feedback control system for speed is incorporated in a feedback system for a position, drawbacks degrading accuracy and instability, depending upon the condition of a control object, can occur. Such drawbacks include instability of speed, failure of speed change at speed change position or hunting at a positioning position.

For example, when a load temporarily grows significantly of some reason, a lag in advancing of the control object occurs. The lag results in an error between the position detected value Dxd and the position command value Dxc becoming temporarily large. Therefore, the control object may exhibit unstable behavior, such as high speed motion upon resolving of the cause of the lag. Particularly, in a clamping operation, for the purpose protection of a mold, a clamping mode is transitioned from a high speed clamping to a low speed clamping before closing the mold. When the position error is significant, upon changing of speed, the clamping mode cannot be smoothly transitioned into the low speed clamping at the speed changing position. This results in clamping occurring during high speed and results in damage to the mold.

SUMMARY OF THE INVENTION

The present invention has been worked out in order to solve the problems in the prior art as set forth above. Therefore, it is an object of the present invention to provide a method and a system for controlling an injection molding apparatus which can constantly perform precise and stable control, irrespective of a state of the control object.

According to one aspect of the invention, an injection molding apparatus comprises: a control object; a driving mechanism connected to said control object to impart movement to said control object; a monitor monitoring one of said control object and said driving mechanism to determine a sensed position of said control object, said monitor transmitting signals representative of the sensed position of said control object, one of said signals being representative of said control object being located at a threshold position; a speed control system for controlling said driving mechanism and a speed command value for said driving mechanism; a position control system for controlling said driving mechanism in response to the sensed position of said control object and a position command value for said control object; a switch connected to said monitor, wherein said switch connect said speed control system to said driving mechanism prior to receiving said one of said signals from said monitor, and connects said position control system to said driving mechanism subsequent to receiving said one of said signals from said monitor.

According to a further aspect of the invention, a method of operating an injection molding apparatus comprises the steps of: providing a control object, a driving mechanism connect to said control object, a monitor, a speed control system, a position control system, and a switch; operating the driving mechanism; moving the control object in response to operation of the driving mechanism; tracking a position of the control object using the monitor; transmitting signals from the monitor representative of the position of the control object; monitoring the signals of the monitor, watching for one signal representative of the control object being located in a threshold position; connecting the speed control system to the driving mechanism via the switch prior to an occurrence of the one signal; and connecting the position control system to the driving mechanism subsequent of the occurrence of the one signal.

Other objects and further scope of applicability of the present invention will become apparent from the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

Next, the preferred embodiment of the present invention will be discussed in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid obscuring the present invention.

At first, the construction of the preferred embodiment of a control system for an injection molding apparatus will be discussed with reference to FIG. 3.

Figure 3:
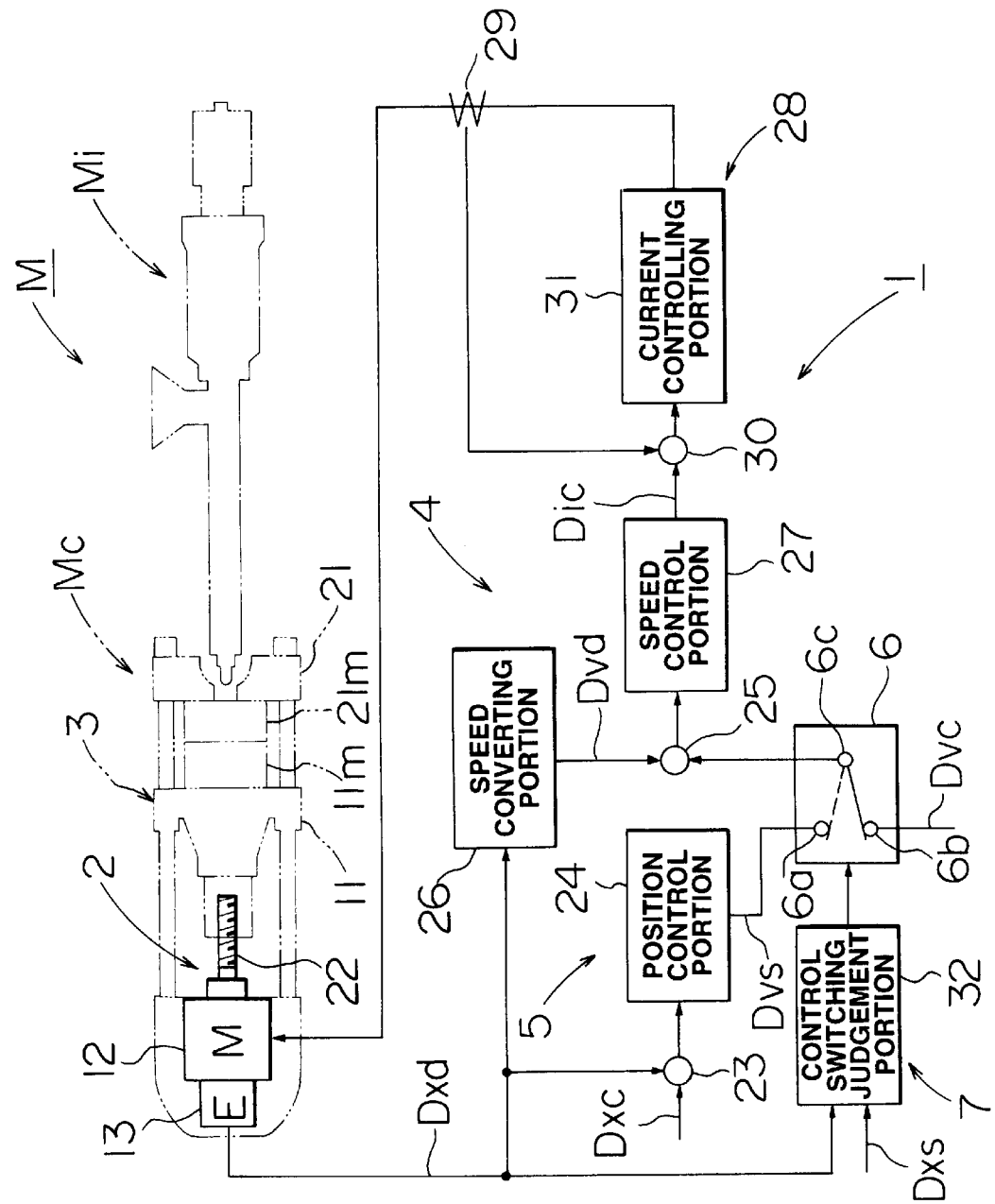
FIG. 3 is a block diagram showing the control system according to the present invention.
Figure 4:
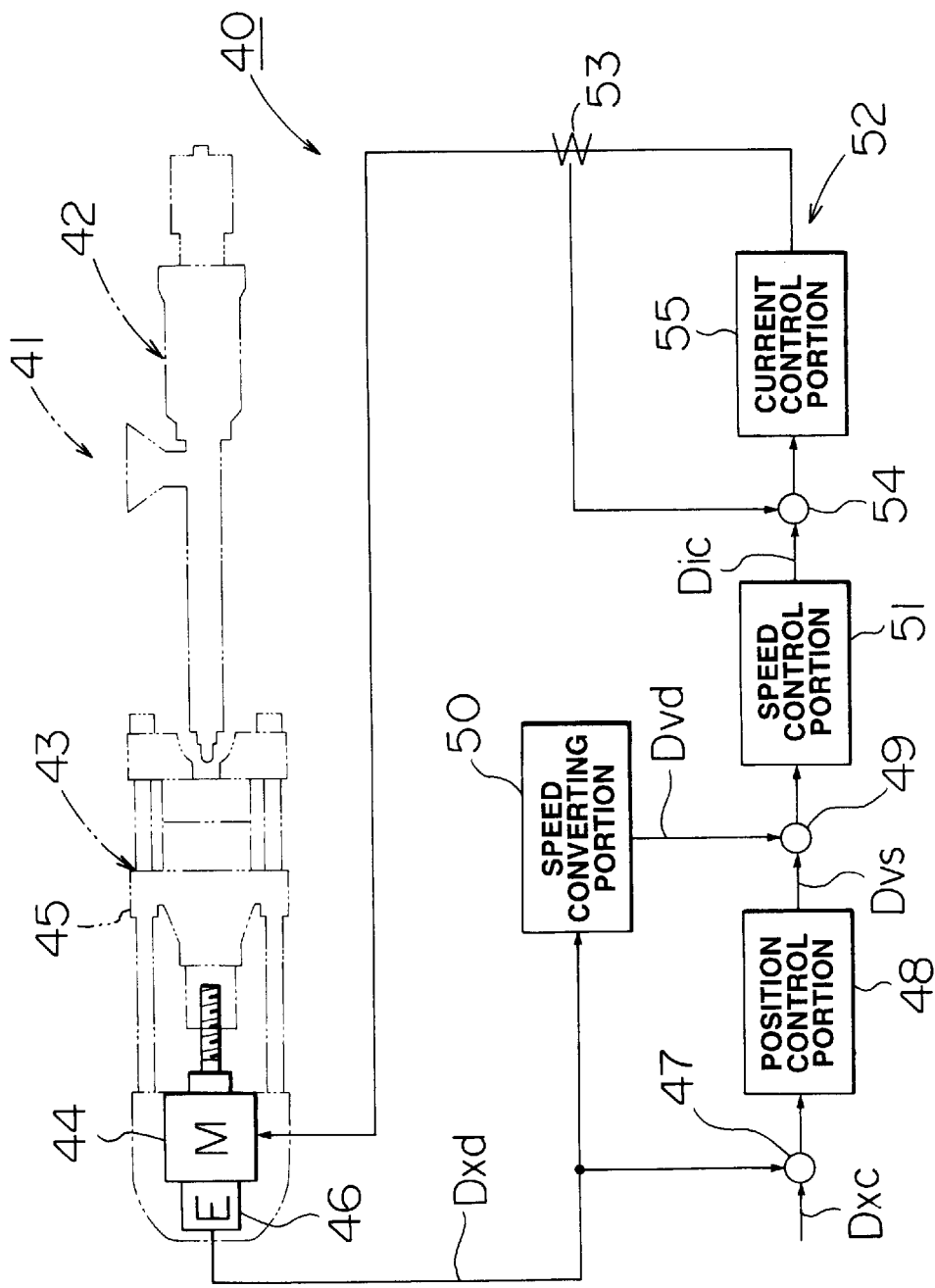
FIG. 4 is a block diagram showing the conventional control system.

In FIG. 3, M denotes the injection molding apparatus which includes an injection device Mi and a clamping device Mc. The clamping device Mc has a stationary platen 21 mounting a stationary mold 21m and a movable platen 11 (control object 3) mounting a movable mold 11m. The movable platen 11 is driven to move in a back and forth direction by means of a drive mechanism portion 2. The drive mechanism portion 2 has a servo motor 12 as a driving source. Revolution of the servo motor 12 is converted into the back and forth motion direction by a ball screw mechanism 22 and transmitted to the movable platen 11.

Reference numeral 1 denotes a control system. The control system 1 includes a speed control system 4 for performing feedback control of a speed for the movable plate 11, and a position control system 5 for performing feedback control of a position of the movable platen 11.

The position control system 5 has a first error detecting portion 23. A position command value Dxc is applied to one input of the first error detecting portion 23. An encoder 13, which indirectly obtains a position of a movable platen 11 by detecting number of revolutions of the servo motor 12, is provided on the servo motor 12. A position detected value Dxd obtained from the encoder 13 is applied to another input of the first error detecting portion 23. An output of the first error detecting portion 23 is connected to an input side of a position control portion 24. The position control portion 24 may include a compensation circuit or so forth. The output side of the position control portion 24 is connected to a first stationary contact 6a of a switch 6.

The speed control system 4 has a second error detecting portion 25. One input of the second error detecting portion 25 is connected to a movable contact 6c of the switch 6. A second stationary contact 6b of the switch 6 receives a speed command value Dvc. Reference numeral 26 denotes a speed converting portion which converts the position detected value Dxd into a speed detected value Dvd. The output side of the speed converting portion 26 is connected to another input of the second error detecting portion 25. The switch 6 functions as a switch between the speed control system 4 and the position control system 5. The output of the second error detecting portion 25 is connected to the input side of the speed control portion 27. The speed control portion 27 may include a compensation circuit or so forth. The output side of the speed control portion 27 is connected to the input side of a feedback control circuit 28. Feedback control circuit 28 includes a current loop. The output side of the feedback control circuit 28 is connected to the servo motor 12. In the feedback control circuit 28, reference numeral 29 denotes a current detecting portion, 30 denotes a third error detecting portion, and 31 denotes a current control portion. The current control portion 31 may include a compensation circuit or so forth. It should be noted that the second error detecting portion 25, the speed control portion 27 and the feedback control circuit 28 are common to the speed control system 4 and the position control system 5.

Figure 2:
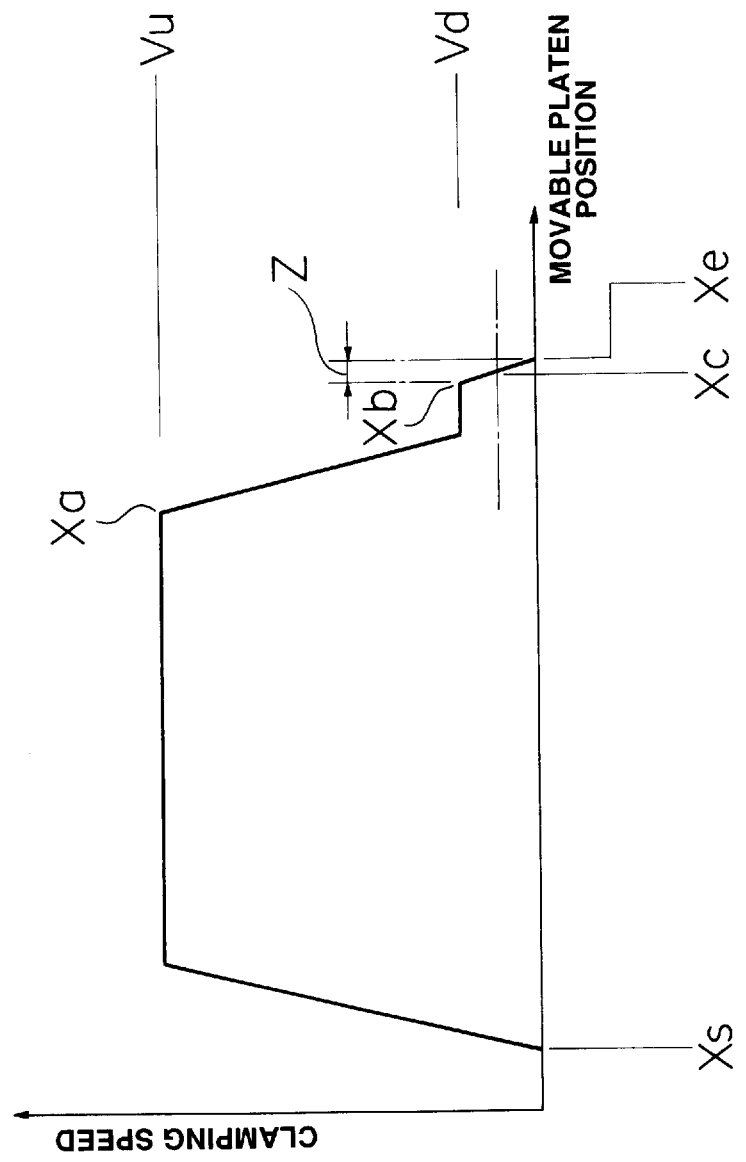
FIG. 2 is a chart showing a control pattern by illustrating clamping speed control relative to a movable platen position.

Reference numeral 7 denotes a switching control portion which includes a control switching judgment portion 32. According to the present invention, a control switching position Xc is preliminarily set. As shown in FIG. 2, the control switching position Xc is set within a deceleration zone Z ahead of a target position Xe. The target position Xe refers to the position at which the movable platen 11 is stopped. The control switching position Xc is approximately several mm ahead of the target position Xe and can be obtained experimentarily. A position setting value Dxs, corresponding to the control switching position Xc, is applied to the control switching judgment portion 32. The control switching judgment portion 32 also receive the position detected value Dxd, obtained from the encoder 13. The control switching judgment portion 32 monitors the position detected value Dxd, and maintains the switch 6 at the side of the speed control system 4 (at the side of the stationary contact 6b). When the position setting value Dxs is reached, the switch 6 is switched to the side of the position control system 5 (side of the stationary contact 6a).

Figure 1:
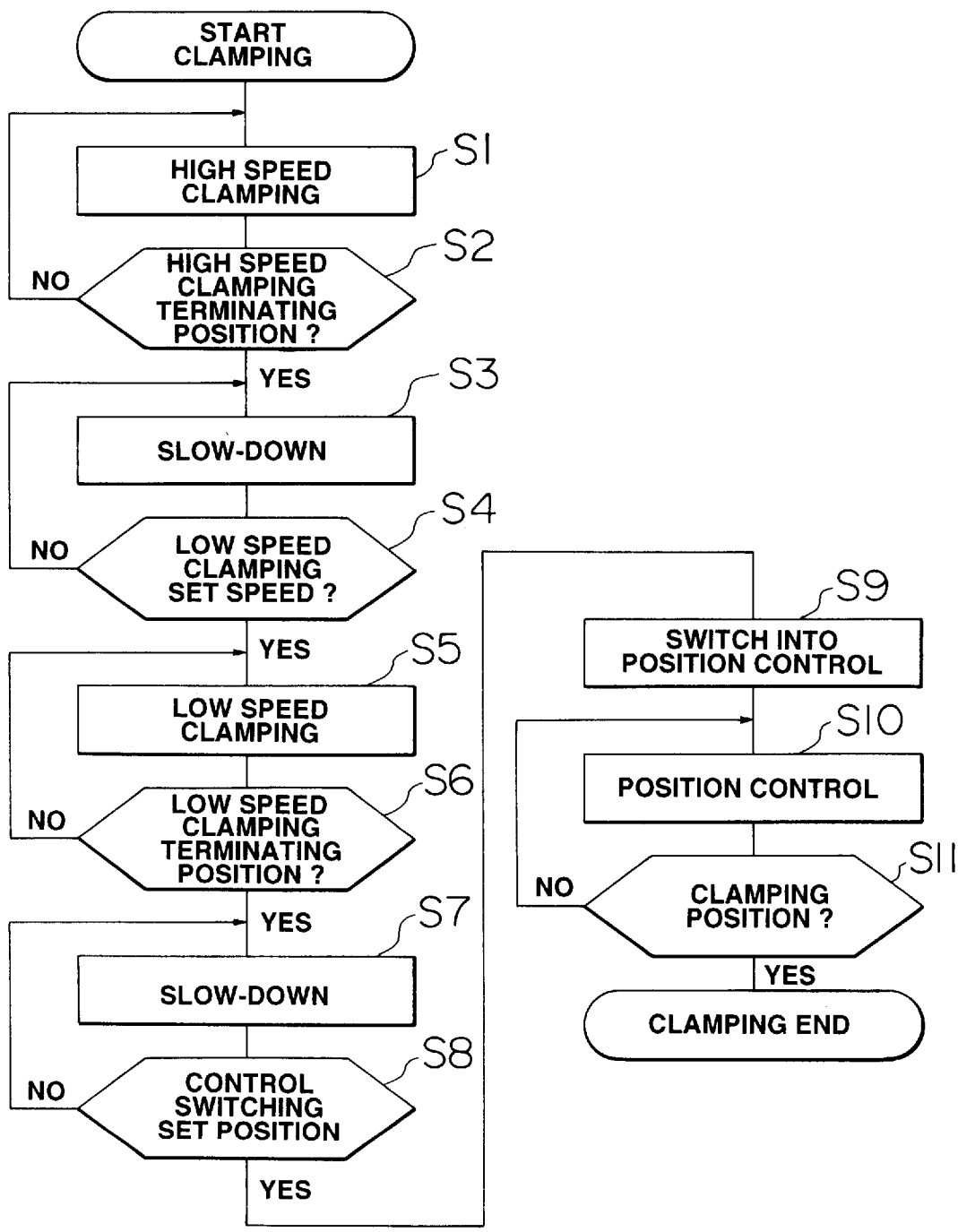
FIG. 1 is a flowchart showing a control method according to the present invention.

Next, a discussion will be given to the operation of the control system 1 with reference to the flowchart of FIG. 1 and further to FIGS. 2 and 3.

FIG. 2 shows a control pattern by illustrating a clamping operation. Initially, the movable platen 11 is situated in a stand-by state at a forward motion start position Xs. The movable platen 11 has not reached the control switching position Xc. Therefore, the switch 6 is maintained at the side of the stationary contact 6b. Accordingly, the servo motor 12 is driven using a feedback control based on the speed of the movable platen 11.

Feedback using the speed control system occurs while the movable platen 11 moves from the forward motion starting position Xs to the control switching position Xc. Namely, during forward motion of the movable platen 11, an error between the speed command value Dvc and the speed detected value Dvd is obtained from the second error detecting portion 25. This error is converted into a current command value Dic via the speed control portion 27. Then, the current command value Dic is applied to the servo motor 12 via the feedback control circuit 28, thereby performing feedback control of the speed for the movable platen 11.

Initially, the movable platen 11 is advanced forward at a high speed corresponding to a first set speed Vu (step S1).

When the movable platen reaches a high speed clamping terminating position Xa, deceleration control is performed (steps S2 and S3). When the motion speed of the movable platen 11 is decelerated to reach a second set speed Vd for low speed clamping, low speed clamping is performed at the second set speed Vd (steps S4 and S5). When the movable platen 11 reaches a low speed clamping terminating position Xb, deceleration control is performed (steps S6 and S7). At this time, the movable platen 11 moves inside the deceleration zone Z. In the deceleration zone Z, the control switching position Xc is set. Therefore, when the movable platen 11 reaches the control switching position Xc, the control switching judgement portion 32 switches the switch 6 toward the side of the stationary contact 6a (steps S8 and S9).

After this step, feedback control for the position of the movable platen 11 is performed by the position control system 5 (step S10). Namely, the error between the position detected value Dxd and the position command value Dxc is obtained from the first error detecting portion 23. The error is converted into a converted speed command value Dvs by the position control portion 24. Then, the converted speed command value Dvs is applied to the switch 6, and then applied to the second error detecting portion 25 in place of the speed command value Dvc. By this, the feedback control of the position is performed for the movable platen 11. Thus, the movable platen 11 is positioned at a target position Xe and the clamping operation is completed (step S11).

The control switching position Xc is set within the deceleration zone Z ahead of the target position Xe. Therefore, during forward motion and in the zone up to the control switching position Xc including the speed changing point, there will be no instability in the speed of the movable platen 11. Also, in the deceleration zone Z from the control switching position Xc to the target position Xe, the control object 3 can be precisely and stably positioned at the target position Xe.

As set forth above, the control method for the injection molding apparatus, according to the present invention, is performed by setting the control switching position Xc within the deceleration zone Z ahead of the target position Xe, effecting feedback control of the speed while the control object 3 moves from the forward motion start position Xs to the control switching position Xc, and effecting feedback control of the position while the control object 3 moves from the control switching position Xc to the target position Xe.

The control system for the injection molding apparatus is provided with the speed control system 4 for performing feedback control of the speed while the control object 3 moves from the forward motion start position Xs to the control switching position Xc, the position control system 5 for performing feedback control of the position while the control object 3 moves from the control switching position Xc to the target position Xe, the switch 6 to switch between the speed control system 4 and the position control system 5, and the switching control portion 7 for making the speed control system 4 active until the control object 3 reaches the control switching position Xc and, responsive to the control object 3 at the control switching position Xc, for effecting switching to make the position control system 5 active. Therefore, during forward motion and in the zone up to the control switching position Xc, the problem of instability in the speed of the control object 3 will never occur. Also, in the deceleration zone Z from the control switching position Xc to the target position Xe, the control object 3 can be precisely positioned at the target position Xe. Therefore, accurate and stable control can be performed irrespective of the condition of the control object 3.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above, but to include all possible embodiments which can be embodied within a scope encompassed and equivalents thereof with respect to the features set out in the appended claims.

For instance, the foregoing discussion has been given in terms of control of the movable platen. The control system according to the present invention is equally applicable for an injection screw in an injection device. Also, while the driving mechanism portion is exemplified as a servo motor, the control system of the present invention could also use a hydraulic cylinder as the driving source.

What is claimed is:

1. A method of operating an injection molding apparatus comprising the steps of:

providing a control object, a driving mechanism connected to said control object, a monitor, a speed converting portion, a speed control portion, a position control portion, a control switching judgement portion, and a switch;

operating the driving mechanism and said control switching judgement portion;

moving the control object in response to operation of the driving mechanism;

tracking a position of the control object using the monitor;

transmitting signals from the monitor representative of the position of the control object;

monitoring the signals of the monitor, watching for one signal representative of the control object being located in a threshold position;

connecting said switch to an output having a set speed command value prior to when said control object reaches said threshold position so that said speed control portion controls said driving mechanism in response to a speed detected value and a set speed command value; and connecting said switch to an output of said position control portion when said control object reaches said threshold position so that said speed control portion controls said driving mechanism in response to the speed detected value and a converted speed command value, whereby instability in speed of the control object during motion thereof prior to said threshold position is substantially reduced while at and subsequent to said threshold position, said control object is precisely and stably positioned.

2. The injection molding method according to claim 1, wherein said control object comprises a movable platen of a mold clamp, and said step of moving the control object comprises moving the movable platen relative to a fixed platen.

3. The injection molding method according to claim 1, wherein said driving mechanism comprises a servo motor, and said step of operating the driving mechanism comprises rotating the servo motor.

4. The injection molding method according to claim 3, wherein said monitor comprises an encoder, and said step tracking a position of the control object comprising evaluating revolutions of a shaft of the servo motor.

5. The method according to claim 1, further comprising the steps of:

receiving the signals from the monitor in the position control portion;

receiving a position command value in the position control portion;

generating the converted speed command by the position control portion; and position controlling the driving mechanism using the converted speed command subsequent to the occurrence of the control object reaching the threshold position.

6. An injection molding apparatus comprising:

a control object;

a driving mechanism connected to said control object to impart movement to said control object;

a monitor monitoring one of said control object and said driving mechanism to determine a sensed position of said control object, said monitor transmitting signals representative of the sensed position of said control object, one of said signals being representative of said control object being located at a threshold position;

a speed converting portion for generating a speed detected value according to the sensed position of said control object;

a speed control portion for controlling said driving mechanism in response to said speed detected value and at least one of a set speed command value and a converted speed command value;

a position control portion for generating said converted speed command value according to the sensed position of said control object and a position command value for said control object;

a control switching judgement portion; and a switch connected to said control switching judgement portion and said speed control portion, said control switching judgement portion connecting said switch to an output having said set speed command value prior to when said control object reaches said threshold position so that said speed control portion controls said driving mechanism in response to the speed detected value and said set speed command value, said control switching judgement portion connecting said switch to an output of said position control portion when said control object reaches said threshold position so that said speed control portion controls said driving mechanism in response to the speed detected value and said converted speed command value, whereby instability in speed of the control object during motion thereof prior to said threshold position is substantially reduced while at and subsequent to said threshold position, said control object is precisely and stably positioned.

7. The injection molding apparatus according to claim 6, wherein said control object comprises a movable platen of a mold clamp.

8. The injection molding apparatus according to claim 6, wherein said driving mechanism comprises a servo motor.

9. The injection molding apparatus according to claim 8, wherein said monitor comprises an encoder for monitoring revolutions of a shaft of said servo motor.

10. The injection molding apparatus according to claim 8, wherein said driving mechanism further comprises a ball screw mechanism for translating a rotary motion of said servo motor into the movement of said control object.

11. The injection molding apparatus according to claim 6, further comprising an error detector having an output connected to an input of said position control portion, said error detector having a first input connected to said monitor for receiving said signals, a second input receiving the position command value, said error detector transmitting an error between said signals and said position command value, said position control portion converting said error into said converted speed command.

* * * * *